Patented July 4, 1933

1,916,657

UNITED STATES PATENT OFFICE

COURTNEY CONOVER, OF ST. LOUIS, MISSOURI, ASSIGNOR, BY MESNE ASSIGNMENTS, TO MONSANTO CHEMICAL COMPANY, A CORPORATION OF DELAWARE

PROCESS OF REFINING CRUDE PHTHALIC ANHYDRIDE

No Drawing.  Application filed November 29, 1926.  Serial No. 151,606.

This invention relates to processes of the kind that are used in the operation of refining crude phthalic anhydride.

Crude phthalic anhydride generally contains small proportions of a number of foreign substances, such as naphthalene, alpha-naphtho-quinone, maleic anhydride, benzoic acid and certain dark colored compounds, and when the crude phthalic anhydride is subjected to distillation or sublimation in the operation of refining it, the impurities which are volatile frequently pass over with the phthalic anhydride, the colored impurities being particularly objectionable in the refined product. With some types or kinds of crude phthalic anhydride it is possible to destroy these volatile colored impurities by heating the crude phthalic anhydride at its boiling point (about 285° C.) for several hours, prior to subjecting it to distillation or sublimation, but with many types or kinds of crude phthalic anhydride such prolonged heat treatment fails to remove or destroy the impurities which impart an objectionable color to the finished product.

I have discovered that the volatile colored impurities generally present in crude phthalic anhydride can be effectively removed or destroyed if certain reagents are mixed with the crude phthalic anhydride and the mixture then subjected to a temperature at or above its melting point prior to the distilling or subliming operation. Accordingly, I propose to subject crude phthalic anhydride to a novel preliminary treatment, followed by distillation or sublimation, which process makes it possible to produce a pure colorless product from crude phthalic anhydride of the kinds that contain colored impurities that cannot be effectively removed simply by a prolonged heat treatment, and which increases the certainty of and reduces the time required for obtaining a pure colorless product from phthalic anhydride of the kinds, which, prior to my discovery, could be refined fairly successfully by subjecting the crude phthalic anhydride to a prolonged heat treatment, followed by distillation or sublimation.

The reagents which I have found to be most efficient for the preliminary treatment or first step of my process are substances which are acidic in character, or which form acidic compounds by decomposition or reaction in the presence of molten phthalic anhydride, it being preferable to use reagents of the general character mentioned which boil at temperatures above 170° C. and which retain or develop their acidic character above that temperature in the presence of phthalic anhydride. I have obtained the best results with mucic, stearic and lactic acids, but various other organic acids can be used advantageously, such as tartaric acid, citric acid and phthalic acid. Phthalic acid is not so desirable, however, as the other acids specifically mentioned, because its use necessitates relatively long, continued heating, or else the application of pressure. In some instances it is possible to use abietic acid in the form of rosin, sulphuric acid and phosphoric acid, but while such substances are active in destroying color, they have the objectionable characteristic of tending to form viscous precipitates in the molten phthalic anhydride, or tending to impart undesirable odors to the refined product. One class of reagents capable of use in the preliminary treatment of the crude phthalic anhydride that are not of an acidic character but which are capable of forming acid compounds by decomposition or reaction in the presence of molten phthalic anhydride, are alcohols of high boiling point which form acid esters in the presence of an excess of a molten phthalic anhydride and act as acids. For example, glycerol, is fairly effective in destroying color, although it may also act in other ways than by forming the acid ester.

The reagents above mentioned can be used in various ways without departing from the spirit of my invention, and the quantities or proportions of the reagent that is used will vary, depending upon the particular reagent employed, the particular type or kind of crude material that is being treated and the temperature and time of heating. They may be used separately or in combination or in the presence of reagents of a different character, and their use may be only one of several steps in a complete process of purifying or refining crude phthalic anhydride.

One procedure that can be followed in practising my process is as follows:

100 parts of crude phthalic anhydride is melted and from 0.2 to 2.0 parts of mucic acid a hydroxy carboxylic acid, is then added to the melted phthalic anhydride, the quantity of mucic acid that is added depending upon the particular type or kind of crude phthalic anhydride that is being refined. After the mucic acid has been added, the temperature of the mixture is raised to the boiling point, and maintained at that temperature for a period varying from two to eight hours, depending upon the type or kind of crude phthalic anhydride used and the proportion or quantity of the reagent that was added to the same. The mass can, of course, be heated to a temperature below boiling point after the reagent is added, but in such an event the period of heating must be prolonged. Temperatures from 200° C. to 290° C. are suitable. After the boiling operation the mixture is subjected to any preferred treatment, so as to separate the phthalic anhydride. I prefer to use distillation or sublimation.

Having thus described my invention, what I claim as new and desire to secure by Letters Patent is:

1. A process for refining crude phthalic anhydride, consisting in melting approximately 100 parts of the crude phthalic anhydride, adding from 0.2 to 2.0 parts of mucic acid to the molten phthalic anhydride, raising the temperature of the mixture to the boiling point, boiling the mixture from two to eight hours, and thereafter separating the phthalic anhydride by volatilization.

2. A preliminary step in the process of refining crude phthalic anhydride, consisting in heating the crude phthalic anhydride with mucic acid.

3. A preliminary step in the process of refining crude phthalic anhydride, consisting in heating the crude phthalic anhydride with mucic acid, at a temperature between 200° C. and 290° C.

4. A process for refining crude phthalic anhydride which consists in heating the crude material with mucic acid, and volatilizing the product from the mixture.

5. The method of refining crude phthalic anhydride formed by air oxidation of naphthalene, which comprises incorporating a high boiling carboxylic acid reagent, maintaining the mixture in a molten state whereby the impurities are rendered separable, and separating phthalic anhydride from the mixture by volatilization.

6. The method of refining crude phthalic anhydride formed by air oxidation of naphthalene, which comprises incorporating a high boiling carboxylic acid reagent, maintaining the mixture between 200°–290° C. whereby impurities are rendered essentially non-volatile, and separating the phthalic anhydride from the mixture by volatilization.

7. The method of refining crude phthalic anhydride formed by the catalytic air oxidation of naphthalene containing characteristic impurities such as maleic acid, benzoic acid, quinones, and color imparting materials, which comprises incorporating in the crude phthalic anhydride a high boiling organic acidic reagent which is retained in the anhydride under the prevailing conditions of the subsequent step, maintaining the resulting mixture at approximately the boiling temperature thereof whereby impurities in the crude anhydride are rendered separable and thereafter separating pure phthalic anhydride from the mixture by volatilization.

8. The preliminary step in the process of refining crude phthalic anhydride consisting in heating the crude phthalic anhydride with a hydroxy carboxylic acid reagent.

9. The preliminary step in the process of refining crude phthalic anhydride consisting in heating the crude phthalic anhydride with lactic acid.

10. The preliminary step in the process of refining crude phthalic anhydride consisting in heating the crude phthalic anhydride with citric acid.

11. The method of refining crude phthalic anhydride formed by the catalytic air oxidation of naphthalene which comprises incorporating an organic acid which is retained in the crude phthalic anhydride under the prevailing conditions of the subsequent step in the refining treatment and subjecting such mixture to approximately the boiling temperature thereof, whereby impurities present in the crude phthalic anhydride are rendered separable, and finally separating pure phthalic anhydride from the mixture by volatilization.

12. The step in refining crude phthalic anhydride formed by the catalytic air oxidation of naphthalene characterized in that the crude material is digested at approximately 200° C.–290° C. whereby impurities present in the crude anhydride are rendered separable, in the presence of an aliphatic organic acid, other than those acids present in the crude product undergoing treatment, which acid is retained in the mixture under the conditions of the digestion.

13. The steps in refining crude phthalic anhydride formed by the catalytic air oxidation of naphthalene, which comprise digesting the crude phthalic anhydride at approximately 170°–280° C. in the presence of a relatively small amount, as compared to the quantity of phthalic anhydride undergoing treatment, of an organic acid other than those acids present in the crude phthalic anhydride undergoing treatment, which acid is retained in the mixture under the conditions of the digestion whereby impurities present in the crude phthalic anhydride are rendered separable, and subsequently separating pure phthalic anhydride from the digested mixture by volatilization.

14. The method of refining crude phthalic anhydride formed by the catalytic air oxidation of naphthalene which comprises incorporating a hydroxy carboxylic acid reagent with the crude phthalic anhydride which acid is retained in the mixture during the subsequent step, digesting the mixture at approximately the boiling temperature thereof whereby impurities present in the crude phthalic anhydride are rendered separable, and subsequently separating the phthalic anhydride from the mixture by volatilization.

15. The method of refining crude phthalic anhydride formed by the catalytic air oxidation of naphthalene which comprises incorporating a high boiling aliphatic hydroxy carboxylic acid with the crude phthalic anhydride which is retained in the mixture during the subsequent step, digesting the mixture at approximately 200°–290° C., whereby impurities present in the crude phthalic anhydride are rendered separable, and subsequently effecting the separation of the pure phthalic anhydride from the mixture by volatilization.

COURTNEY CONOVER.